United States Patent
Ganesh (10) Patent No.: US 6,999,777 B1
(45) Date of Patent: Feb. 14, 2006

(54) METHOD FOR PROVIDING LOCATION INFORMATION OF A WIRELESS COMMUNICATION DEVICE

(75) Inventor: Rajamani Ganesh, Bedford, MA (US)

(73) Assignees: Verizon Corporate Services Group Inc., New York, NY (US); BBNT Solutions LLC, Cambridge, MA (US)

( * ) Notice: Subject to any disclaimer, the term of this patent is extended or adjusted under 35 U.S.C. 154(b) by 531 days.

(21) Appl. No.: 10/032,202

(22) Filed: Dec. 21, 2001

(51) Int. Cl.
*H04Q 7/20* (2006.01)
*H04Q 7/38* (2006.01)

(52) U.S. Cl. .............. 455/456.1; 455/456.3; 455/456.5; 455/456.2; 455/422.1; 709/216; 709/219; 709/203

(58) Field of Classification Search ............ 455/456.1, 455/456.2, 456.3, 456.4, 456.5, 456.6, 457, 455/414.1, 414.2, 404.1, 404.2, 422.1, 517, 455/403, 500, 406, 407, 408, 433, 435.1, 455/445, 412.1, 412.2, 550.1, 432.1, 414.3, 455/426.1, 426.2; 709/216, 219, 224, 203
See application file for complete search history.

(56) References Cited

U.S. PATENT DOCUMENTS

| | | | |
|---|---|---|---|
| 4,902,487 A | 2/1990 | Cooper et al. | 423/215.5 |
| 5,086,394 A | 2/1992 | Shapira | |
| 5,572,221 A | 11/1996 | Marlevi et al. | |
| 5,727,385 A | 3/1998 | Hepburn | 60/297 |
| 5,874,057 A | 2/1999 | Deeba et al. | 423/239.1 |
| 5,968,861 A | 10/1999 | Feeley et al. | 502/74 |
| 5,974,330 A * | 10/1999 | Negishi | 455/457 |
| 5,992,142 A | 11/1999 | Pott | 60/274 |
| 6,074,976 A | 6/2000 | Tabata et al. | 502/74 |
| 6,080,377 A | 6/2000 | Deeba et al. | 423/239.2 |
| 6,087,295 A | 7/2000 | Kharas et al. | 502/300 |
| 6,093,378 A | 7/2000 | Deeba et al. | 423/213.5 |
| 6,112,074 A | 8/2000 | Pinder | |
| 6,146,602 A | 11/2000 | Narula et al. | 423/213.5 |
| 6,182,443 B1 | 2/2001 | Jarvis et al. | 60/274 |
| 6,327,471 B1 | 12/2001 | Song | |
| 6,327,533 B1 * | 12/2001 | Chou | 701/207 |
| 6,400,956 B1 | 6/2002 | Richton | |
| 6,463,272 B1 | 10/2002 | Wallace et al. | |
| 6,609,005 B1 | 8/2003 | Chern | |
| 6,662,016 B1 * | 12/2003 | Buckham et al. | 455/457 |
| 6,694,143 B1 | 2/2004 | Beamish et al. | |
| 6,731,940 B1 | 5/2004 | Nagendran | |
| 6,813,502 B2 | 11/2004 | Son et al. | |

(Continued)

FOREIGN PATENT DOCUMENTS

WO  WO 01/12320 A1  2/2001

OTHER PUBLICATIONS

US 6,731,928, 05/2004, Tanaka (withdrawn)

*Primary Examiner*—Keith Ferguson
(74) *Attorney, Agent, or Firm*—Leonard C. Suchtya, Esq.; Joel Wall, Esq.; Meschkow & Gresham (57) ABSTRACT

A method (36) for providing location information of a wireless communication device (24) within a wireless communication network (20) calls for determining the coverage areas (26) of particular cell sites (22) through which the device (24) communicated during past calls. These coverage areas (26) are defined as the approximate location information for the device (24) and are provided to an authorized requesting party via a map-enabled web page (156).

22 Claims, 10 Drawing Sheets

U.S. PATENT DOCUMENTS

2001/0004600 A1    6/2001  Son et al.
2003/0060212 A1 *  3/2003  Thomas ..................... 455/456
2003/0163251 A1 *  8/2003  Obradovich et al. ........ 701/208
2004/0058692 A1 *  3/2004  Kall et al. ............... 455/456.1

* cited by examiner

Carrier's Webpage

Person/Phone Call-History/Location Determination Request

Enter phone numbers of cellular phones you wish to locate     How many past calls? 70

(781) 466 - 3275    68

(___) ___ - ____    72

3    74

[ SUBMIT ] 76

FIG. 5    66

Carrier's Webpage

Person/Phone Call-History/Location Determination Result

The location and call-history information that you requested on phone number (781) 466-9208 could not be found. This could be due to the following reasons:

a) The mobile phone user does not wish to reveal this information at the present time
b) The phone number is not valid (disconnected or we do not provide service to this phone)
c) your login-ID is not included in the mobile-phone's user profile
d) Switch data is not available at the present time Do you wish to receive the call-history/location information at a later time?

[YES]  [NO]

| CALL HISTORY LOG FOR DIALING NUMBER: (781)466-3275 /72 | | | | | |
|---|---|---|---|---|---|
| /108 CALL RECORD NUMBER | /110 LOCATION INFO | /112 CALL ORIG. TIME | /114 CALL LENGTH (MIN) | /116 DESTINATION NUMBER | /118 CELL SITE LOCATION |
| 1 /120 | CELL SITE A, SECTOR 2 /126 | 10:15:35 AM /128 | 20 /132 | INCOMING /134 (781)466-6647 /136 | ELM ST & 47TH AVE /138 |
| 2 /146 | CELL SITE B, SECTOR 2 | 9:55:17 AM /148 | 12 | OUTGOING (302)765-2233 | WESTON BLVD & DOWNING ST |
| 3 /150 | CELL SITE X, SECTOR 4 | 09:18:56 AM /152 | 4.2 | OUTGOING (781)464-7689 | RIVER STREET & 88TH AVE |

| CALL HISTORY LOG FOR DIALING NUMBER: (781)466-3275 ||||||
|---|---|---|---|---|---|
| CALL RECORD NUMBER | LOCATION INFO | CALL ORIG. TIME | CALL LENGTH (MIN) | DESTINATION NUMBER | CELL SITE LOCATION |
| 1A | CELL SITE A, SECTOR 1 (CALL START) | 10:15:35 AM | 20 | INCOMING (781)466-6647 | ELM ST & 47$^{TH}$ AVE |
| 1B | CELL SITE A, SECTOR 2 (CALL END) | 10:15:35 AM | 20 | INCOMING (781)466-6647 | ELM ST & 47$^{TH}$ AVE |
| 2A | CELL SITE B, SECTOR 1 (CALL START) | 9:55:17 AM | 12 | OUTGOING (302)765-2233 | WESTON BLVD & DOWNING ST |
| 2B | CELL SITE B, SECTOR 2 (CALL ACTIVE) | 9:55:17 AM | 12 | OUTGOING (302)765-2233 | WESTON BLVD & DOWNING ST |
| 2C | CELL SITE C, SECTOR 3 (CALL END) | 9:55:17 AM | 12 | OUTGOING (302)765-2233 | CHURCH ST & 5$^{TH}$ ST |
| 3 | CELL SITE X, SECTOR 4 | 09:18:56 AM | 4.2 | OUTGOING (781)464-7689 | RIVER STREET & 88$^{TH}$ AVE |

METHOD FOR PROVIDING LOCATION INFORMATION OF A WIRELESS COMMUNICATION DEVICE

RELATED INVENTION

The present invention is related to "Method For Providing A Current Location Of A Wireless Communication Device," by Rajamani Ganesh, U.S. patent application Ser. No. 10/032,355, co-pending and filed on date even herewith.

TECHNICAL FIELD OF THE INVENTION

The present invention relates to the field of wireless communication networks. More specifically, the present invention relates to providing an approximate location of wireless communication devices in a wireless communication network to an authorized requesting party.

BACKGROUND OF THE INVENTION

Today's society is highly mobile. That is, individuals can move rapidly from one location to the next by utilizing automobiles, mass transit, bicycles, and the like. The advantages of communication any time and almost anywhere, advances in technology, and the affordability of wireless communication devices, such as cell phones, pagers, personal communications systems (PCS), and personal digital assistants (PDA) have resulted in a proliferation of wireless communication devices in this mobile society. As such, many more individuals, particularly children, teenagers, and the elderly, recognizing the many advantages in being able to initiate and receive calls while away from home, are being enrolled in ever-increasing numbers to wireless communication services.

To parents and guardians, outfitting their dependents with wireless communication devices provides a means for their dependents to call for help in an emergency and a means for parents and their dependents to stay in touch. Thus, telecommunications provides parents and guardians with technologically facilitated control and supervision of their dependents.

Unfortunately, a problem for users of wireless communication devices, and particularly for those seeking to find them, is the apprehension that occurs when the user of the wireless communication device is not available via the wireless device, i.e., an individual does not answer the device when it rings, the device is not functioning, or when wireless service is not available. In addition, mobility, the main advantage offered by a wireless communication device, is also a disadvantage in these situations. For example, the parent or guardian unsuccessfully seeking to locate their dependent via the wireless device may not know where their dependent is because by using a wireless device, a dependent is not required to be at a fixed location to communicate with his or her guardians.

Various techniques are being developed to locate wireless communication devices in response to the Federal Communications Commission (FCC) E-911 Phase II mandate. This mandate defines the accuracy of the location determination techniques, and sets forth a timeline as to when the technology is to be ready for aiding emergency workers in tracking down the location of a wireless phone from which a 911 call originated. These techniques encompass both network-based and handset-based equipment and processes. Currently, these techniques are not yet fully implemented. Moreover, these techniques involve costly enhancements to the communication network infrastructure and/or to the wireless communication devices. As such, these techniques are not practical for immediate implementation as a tool for parents and guardians to locate their dependents.

A location determination tool to be utilized by the general public should be readily accessed by authorized individuals, and safeguards should be implemented to secure sensitive personal information from unauthorized individuals. Moreover, the location information should be provided in a format that is readily interpreted by the authorized individual. Accordingly, what is needed is a location determination process for locating a wireless communication device that may be immediately implemented, take advantage of existing technology, and be readily interpreted by the appropriate individuals.

SUMMARY OF THE INVENTION

Accordingly, it is an advantage of the present invention that a method is provided for supplying location information of a wireless communication device within a wireless communication network.

It is another advantage of the present invention that a method is provided that supplies location information by utilizing existing technology.

Another advantage of the present invention is that a method is provided that supplies the location information in a format that is readily interpreted by a concerned individual.

Yet another advantage of the present invention is that a method is provided having safeguards in place to prevent unauthorized individuals from receiving the location information.

The above and other advantages of the present invention are carried out in one form by a method for providing location information of a wireless communication device within a wireless communication network. The method calls for receiving a request for the location information from a requesting party and verifying that the requesting party is an authorized party. When the requesting party is the authorized party, the method determines the location information in response to wireless communication between the wireless communication device and a transceiver site of the wireless communication network, and supplies the location information to the requesting party.

The above and other advantages of the present invention are carried out in another form by a method for supplying location information of a wireless communication device within a wireless communication network. The method calls for providing a first web page having a requester log-in section and, following detection of a successful log-in attempt at the requester log-in section, providing a second web page having a device identifier field. Following detection of a device identifier of the wireless communication device in the device identifier field, the method further calls for providing a third web page having a map of a geographical area overlaid with coverage areas of transceiver sites through which calls were routed, the wireless communication device having participated in the calls. Associated ones of the coverage areas define the location information at instants of the calls.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
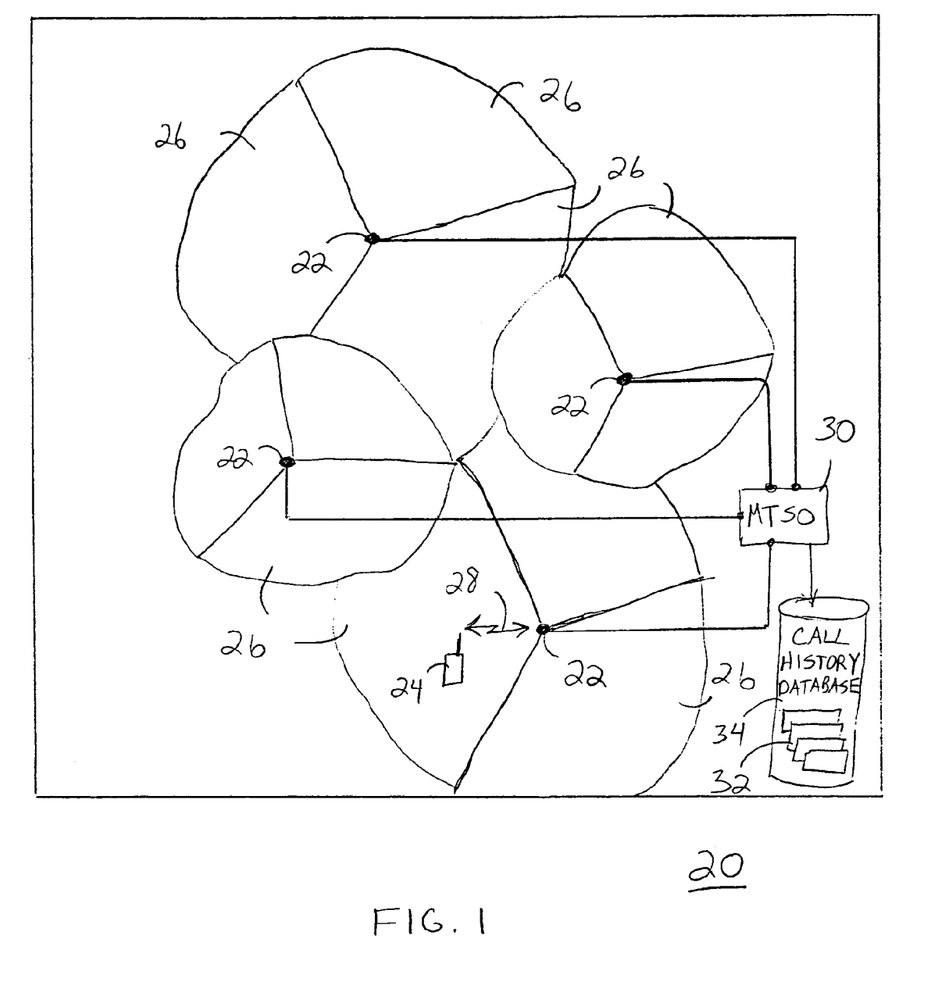
FIG. 1 shows a diagram of a wireless communication network employing a number of cell sites.

FIG. 1 shows a diagram of a wireless communication network 20 employing a number of transceiver sites, also known as cell sites 22. Wireless communication network 20 utilizes radio frequency (RF) cell sites 22 to transmit and receive RF signals to wireless communication devices 24, of which only one is shown. Generally, these cell sites 22 may be spaced from as little as one half mile apart in a metropolitan area and as great as twenty miles apart in a rural area to achieve acceptable results. Consequently, a large metropolitan area can include hundreds of individual cell sites 22. In addition, many cell sites 22 currently in use in large metropolitan areas take advantage of directional antennas (not shown) so that the service area of a single one of cell sites 22 is subdivided into a number of sectored coverage areas 26. By using directional antennas, each providing one hundred twenty to sixty degrees of directionality, respectively, the transmission area of cell sites 22 may be subdivided into three or six coverage areas 26.

Wireless communication device 24 may be a cell phone, a pager, a personal communications system (PCS), a personal digital assistant (PDA), and so forth that engages in wireless communication through one of cell sites 22, by techniques known to those skilled in the art.

Per convention, when wireless device 24 participates in a wireless phone call (either incoming or outgoing), a channel connection 28 is established between wireless communication device 24 and one of cell sites 22. Upon establishment of channel connection 28 through a call center, such as a mobile telephone switching office (MTSO) 30, also known as a "switch", the cellular service provider (carrier) collects call-history information about the wireless phone call. The call-history information includes, for example, the time, date, phone number called, duration of the call, and identifiers for one of cell sites 22 and the sector (i.e. directional antenna) in communication with wireless communication device 24 and through which the call is routed. This call-history information, or call record 32, is typically retained by the service provider in a comprehensive call history database 34 of call records 32 for the subscribers operating in wireless communication network 20. Call records 32 are utilized by the service provider of wireless communication network 20 for record keeping purposes, such as billing and for providing subscribers with enhanced services such as last numbers dialed, caller ID, and so forth.

The present invention facilitates access to particular call records 32 presently accumulated in call history database 34 to provide a concerned individual with approximate location information of wireless communication device 24, hence its user.

Figure 2:
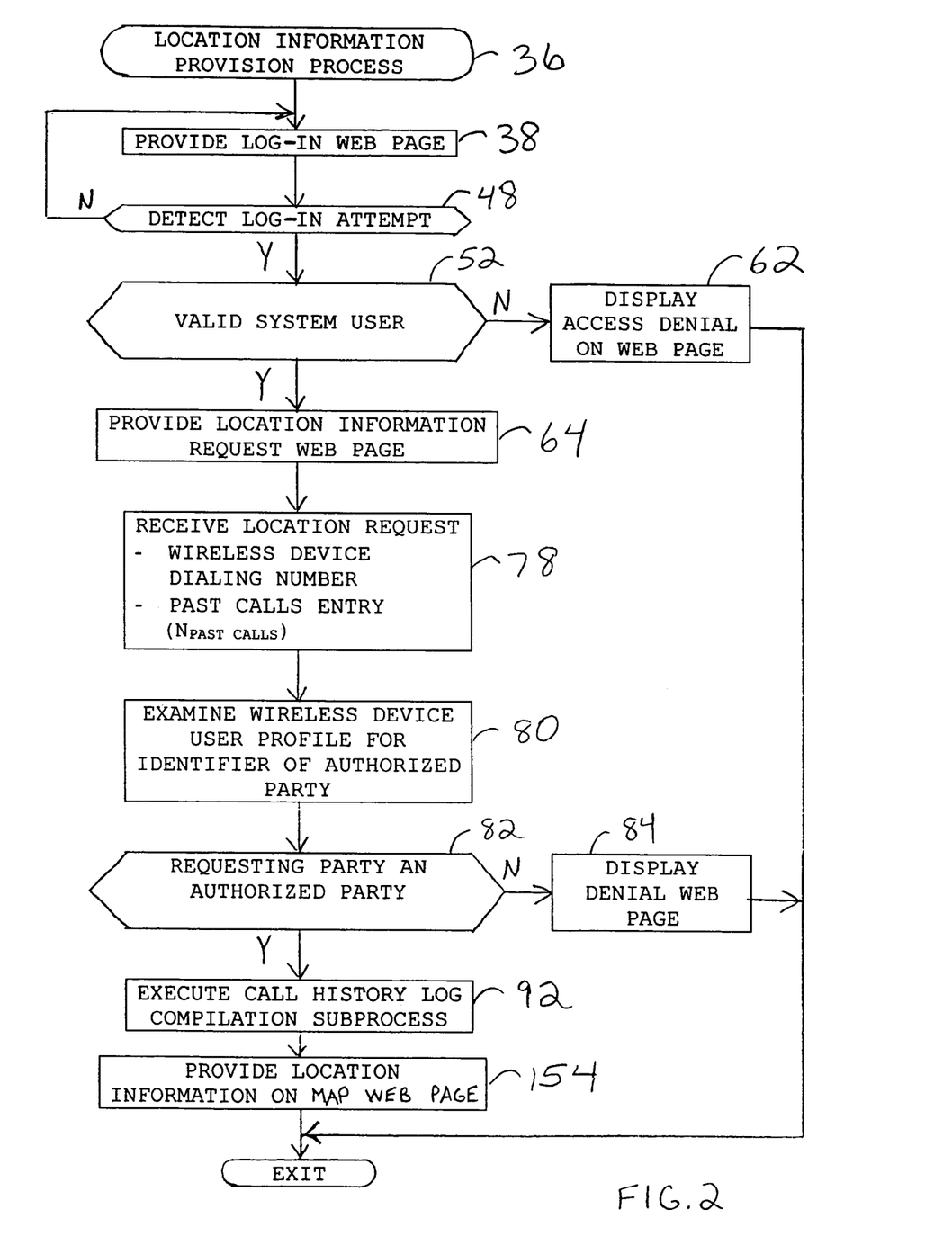
FIG. 2 shows a flow chart of a location information provision process in accordance with a preferred embodiment of the present invention.

FIG. 2 shows a flow chart of a location information provision process 36 in accordance with a preferred embodiment of the present invention. Location information provision process 36 is presented to a subscriber by a service provider of wireless communication network 20 (FIG. 1) as an enhanced service for permitting authorized location determination of wireless communication device 24 (FIG. 1). In a preferred embodiment, process 36 is implemented through executable code stored on computer-readable storage medium of a server system connected to the Internet. The executable code instructs the server system to provide various web pages maintained by the service provider, or contracted by the service provider to a third party, that are accessed via the Internet.

As known to those skilled in the art, a web page is a document created with Hypertext Markup Language (HTML) that is part of a group of hypertext documents or resources available on the World Wide Web and accessible via the Internet. The web page may be read using a software program known as a web browser that displays the web pages as formatted presentations, with any associated graphics, sound, and video, on a computer screen. The present invention employs web pages and uses the Internet as a transport mechanism for the location information provided through the execution of process 36. Alternatively, the location information may be provided through phone, fax, or electronic mail.

Process 36 begins with a task 38. At task 38, a log-in web page is provided.

Figure 3:
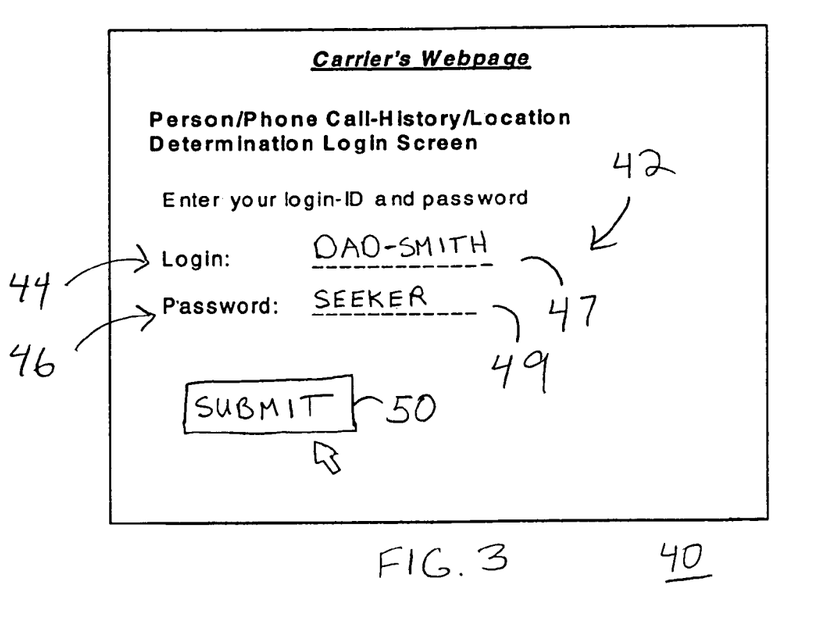
FIG. 3 shows a diagram of a first web page supplied by a service provider of the wireless communication network.

Referring to FIG. 3 in connection with task 38, FIG. 3 shows a diagram of a first web page, or a log-in web page 40, supplied by a service provider of wireless communication network 20 (FIG. 1). Log-in web page 40 is accessed when a requesting party enters a Uniform Resource Locator (URL) for log-in web page 40. The URL describes the type of access method being used (for example, http) and the server location which hosts the Web site of which log-in web page 40 is a part of. Log-in web page 40 is a fill-in form that includes a requester log-in section 42 having a Login field 44 and a Password field 46.

Following the provision of log-in web page 40, process 36 proceeds to a query task 48. At query task 48, process 36 determines whether a log-in attempt is detected. That is, query task 48 determines if requester identifiers in the form of a requester log-in identifier 47 and a requester password 49 are entered into Login field 44 and Password field 46, respectively, of requester log-in section 42 and submitted through activation of a SUBMIT field 50 provided with log-in web page 40. SUBMIT field 50 is an image area in log-in web page 40 on which a user can click to attempt to continue the execution of process 36. When query task 48 fails to detect a log-in attempt, process 36 loops back to task 38 to continue provision of log-in web page 40 and to await a log-in attempt. However, when a log-in attempt is detected at query task 48, process 36 proceeds to a query task 52.

At query task 52, process 36 determines whether the log-in attempt detected at query task 48 is being performed by a valid system user. Process 36 operates under the prerequisite that a service agreement has been established when service is initiated for wireless communication device 24 (FIG. 1), or in response to an upgrade of services provided to wireless communication device 24.

Figure 4:
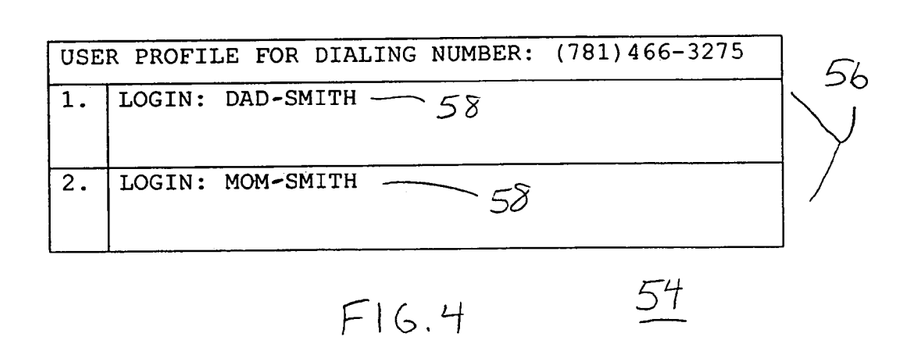
FIG. 4 shows a table of an exemplary user profile established during initiation of service to a wireless communication device in accordance with the present invention.

FIG. 4 shows a table of an exemplary user profile 54 established during initiation of service to wireless communication device 24 in accordance with the present invention. User profile 54 contains authorized party identifiers 56 of individuals who are valid system users and are authorized to receive location information of wireless communication device 24 at any time. User profile 54 is generally created and maintained at wireless communication device.

In an exemplary embodiment, user profile 54 includes two authorized parties, each identified by distinct authorized party identifiers 56 that include a unique log-in identifier 58. Individuals who have authorized party identifiers 56 in particular user profiles 54, and have subscribed to the location information provision service, are considered valid system users. Consequently, the authorized party identifiers 56 for all valid system users may be compiled in a single database (not shown) of valid system users. This single database may also correlate the appropriate requester password, such as requester password 49, with log-in identifier 58.

Referring back to FIGS. 2–3, when query task 52 determines that Login field 44 and/or Password field 46 fails to contain information identifying a valid system user, process 36 proceeds to a task 62.

At task 62, process 36 displays an access denial message either on first web page 40, or alternatively, on a new web page (not shown). Following task 62, process 36 exits without releasing location information to an invalid system user.

However, when query task 52 determines that Login field 44 and Password field 46 contain information identifying a valid system user, for example, one of authorized party identifiers 56, process 36 proceeds to a task 64 where a second web page is provided.

Figure 5:
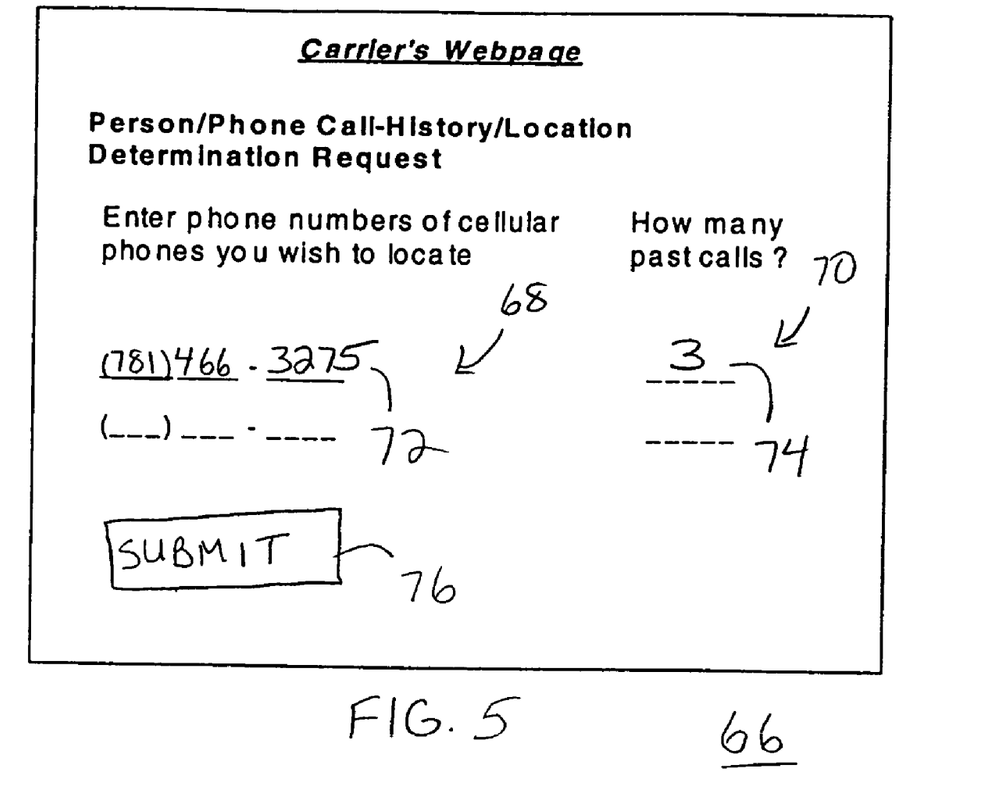
FIG. 5 shows a diagram of a second web page provided by the service provider following a successful log-in attempt through the first web page of FIG. 3.

FIG. 5 shows a diagram of a second web page, or a location information request web page 66, provided by the service provider following a successful log-in attempt through log-in web page 40 (FIG. 3). Location information request web page 66 includes a dialing number field 68 and a previous calls field 70. Dialing number field 68 is provided for the entry of a dialing number 72 of wireless communication device 24. Dialing number 72 is the number dialed when attempting to establish contact with device 24. Previous calls field 70 is provided for the submission of a previous calls entry 74 specifying a quantity of calls for which location information is to be provided (discussed below).

Dialing number 72 and previous calls entry 74 are submitted through activation of a SUBMIT field 76 provided with location information request web page 66. SUBMIT field 76 is an image area in location information request web page 66 on which a user can click to request location information for wireless communication device 24 (FIG. 1).

Referring back to process 36 (FIG. 2), following providing task 64, process control proceeds to a task 78. At task 78, a location request in the form of dialing number 72 (FIG. 5) and previous calls entry 74, $N_{PAST\ CALLS}$, (FIG. 5) is received.

Following task 78, a task 80 is performed. At task 80, user profile 54 (FIG. 4) for wireless communication device 24 (FIG. 1) is examined to obtain authorized party identifiers 56 (FIG. 4).

A query task 82 is performed in cooperation with task 80. Query task 82 determines whether a requesting party is an authorized party. More specifically, query task 82 compares requester log-in identifier 47 (FIG. 3) and requester password 49 (FIG. 3) with authorized party identifiers 56 (FIG. 4) within user profile 54 (FIG. 4). When query task 82 fails to match requester log-in identifier 47 and requester password 49 with authorized party identifiers 56 of user profile 54, program control proceeds to a task 84 in which a denial web page is presented to the requester.

Figure 6:
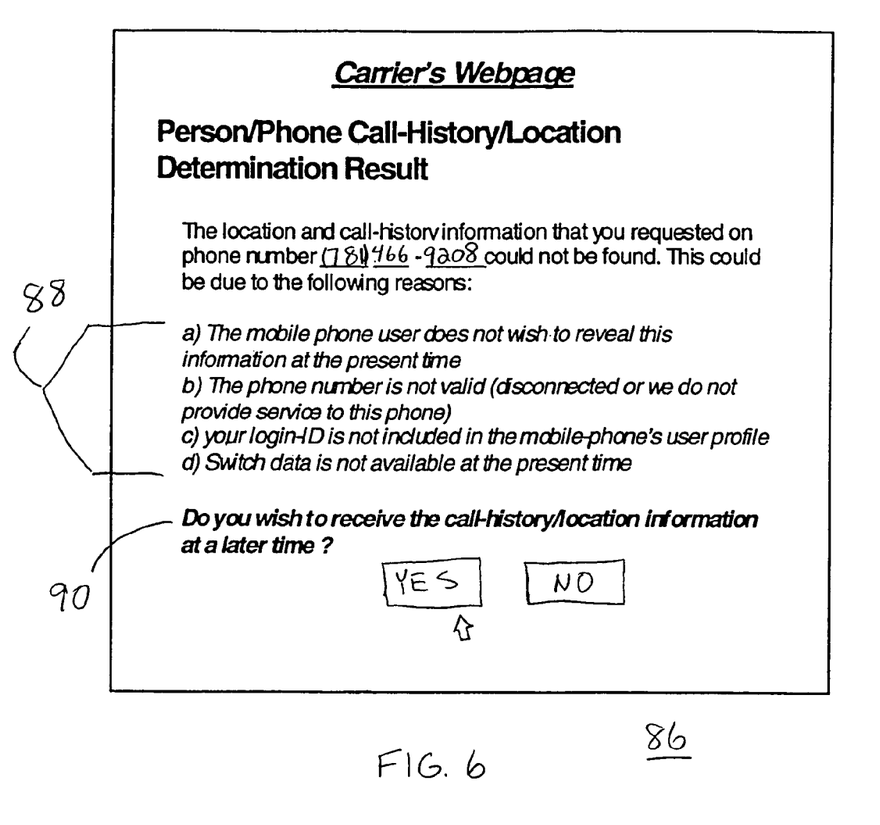
FIG. 6 shows a diagram of an access denial web page provided by the service provider following an unsuccessful attempt to obtain location information of a wireless communication device.

Referring to FIG. 6 in connection with task 84, FIG. 6 shows a diagram of an access denial web page 86 provided by the service provider following an unsuccessful attempt to obtain location information of wireless communication device at task 82. Access denial web page 86 may contain various possible explanations 88 describing why access to information location was denied, including the "login-ID is not included in the mobile-phone's user profile." Access denial web page 86 may provide an option, in the form of a query 90, to receive the location information later (discussed below). Following the display of access denial web page 86 at task 84, location information provision process 36 exits without releasing any location information to an unauthorized requesting party.

With reference back to query task 82 of process 36 (FIG. 2), when query task 82 verifies a match between requester log-in identifier 47 and requester password 49 with authorized party identifiers 56 of user profile 54, program control proceeds to a task 92. In other words, the requesting party is an authorized requesting party. At task 92, a call history log compilation subprocess is executed.

Figure 7:
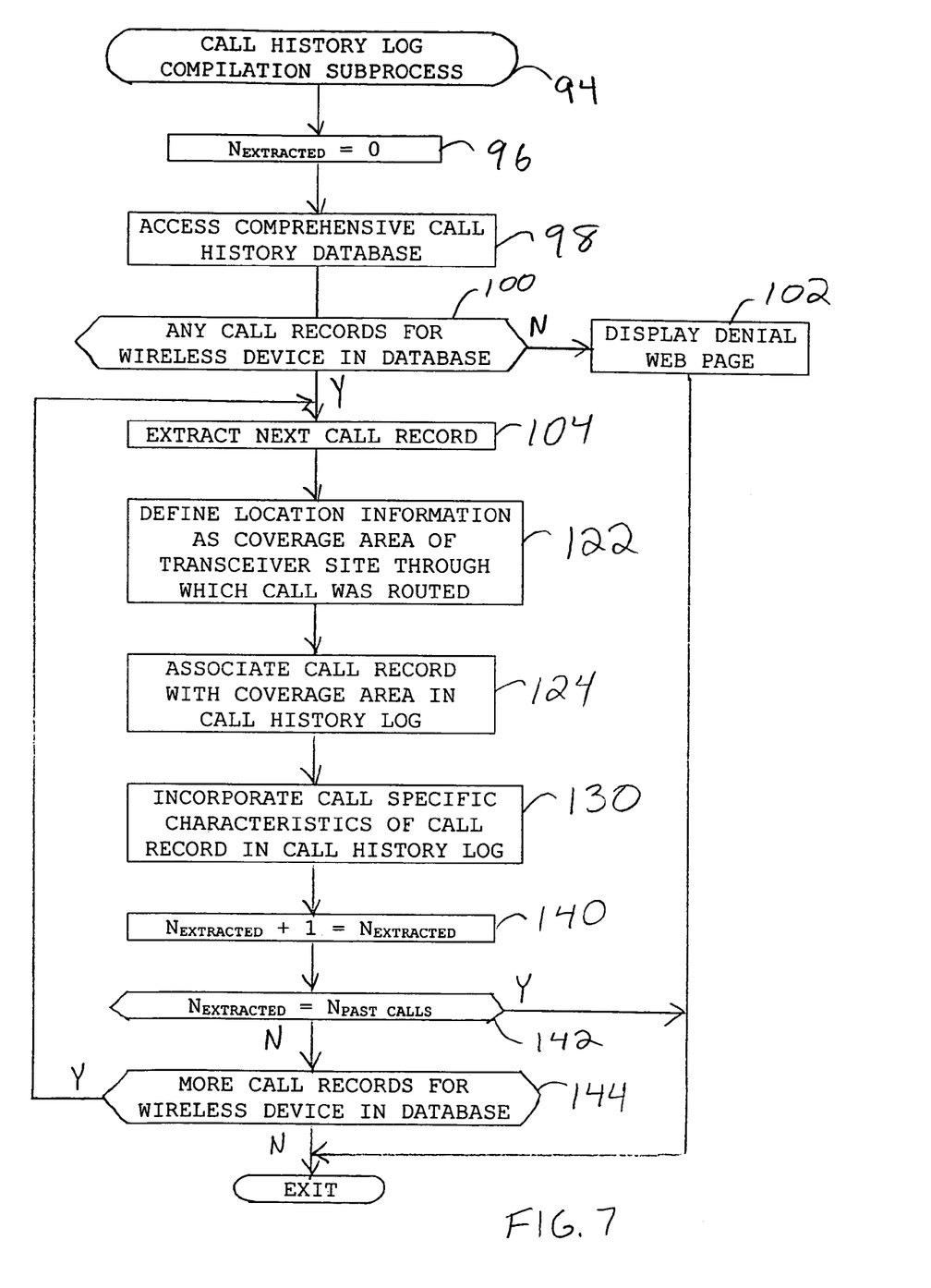
FIG. 7 shows a flow chart of a call history log compilation subprocess.

FIG. 7 shows a flow chart of a call history log compilation subprocess 94. Call history log compilation subprocess 94 is executed to provide approximate location information of wireless communication device 24 (FIG. 1) by examining the call history of device 24. Subprocess 94 is executed at task 92 (FIG. 2) of location information provision process 36 (FIG. 2) by a server system of a service provider, or by a third party contracted by the service provider, utilizing existing technology and information retained as call records 32 (FIG. 1) in comprehensive call history database 34 (FIG. 1).

Subprocess 94 begins with a task 96. At task 96, a quantity of call records 32 extracted from database 34 ($N_{EXTRACTED}$) is set to zero. Thus, task 96 is an initialization activity which sets an initial value of a counter that will later be compared with previous calls entry 74 (FIG. 5) as discussed below.

Following task 96, a task 98 is performed. At task 98, comprehensive call history database 34 is accessed. Those skilled in the art of database organization will recognize that database 34 may be configured in numerous ways. For example, database 34 may be partitioned by geographical regions, call types, service types, and so forth. In addition, sections of database 34 may be retained on more than one server system. The particular format of database 34 is not relevant to the present invention. Rather, the information content, currently retained by the service providers and stored in database 34, is pertinent to the present invention.

A query task 100 is performed in cooperation with task 98. At query task 100, database 34 is examined to determine whether database 34 contains any call records 32 for wireless communication device 24 (FIG. 1). In an exemplary embodiment, query task 100 may result in the examination of call records 32 retained in database 34 over the most recent period of time, for example, for the past twenty-four hours, for a particular calendar date, or for any other pertinent period of time.

When query task 100 fails to find any call records 32, compilation subprocess 94 proceeds to a task 102. At task 102, access denial web page 86 (FIG. 6) or some other equivalent information is provided stating possible explanations as to why no location information may be provided, for example, "switch data is not available at the present time." However, query 90 provides an option for receiving location information at a later time if, for example, database 34 is currently inaccessible or if call records 32 obtained from MTSO 30, i.e., the switch, (FIG. 1) are currently unavailable. Following task 102, subprocess 94 exits without obtaining any location information pertinent to wireless communication device 24 (FIG. 1).

However, when query task 100 determines that there are call records 32 (FIG. 1) for wireless communication device 24 in comprehensive call history database 34, subprocess 94 proceeds to a task 104. At task 104, the next one of call records 32 is extracted, or copied, from database 34. In a preferred embodiment, task 104 extracts call records 32 by last in, first out methodology. In other words, task 104 examines origination times of incoming and outgoing calls in which wireless communication device 24 participated and for which call records 32 were created and selects a most recent, i.e. latest, call.

Figure 8:
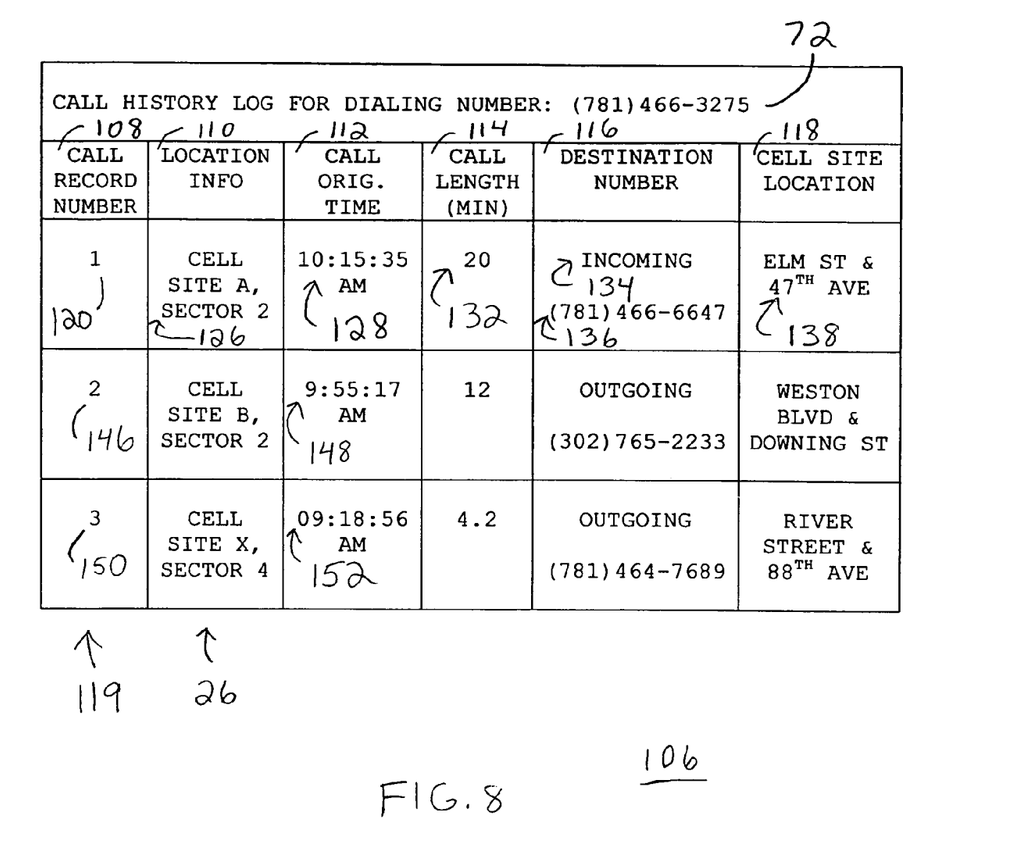
FIG. 8 shows a table of an exemplary call history log for a wireless communication device compiled during the execution of the subprocess of FIG. 7.

Referring to FIG. 8 in connection with subprocess 94, FIG. 8 shows a table of an exemplary call history log 106 compiled through the execution of subprocess 94 for wireless communication device 24 (FIG. 1). Call history log 106 may include a call record number field 108, a location information field 110, a call origination time field 112, a call length field 114, a call destination number field 116, and a cell site location field 118, which is the information retained within database 34.

Call history log 106 for dialing number 72 includes call records 32, each individually identified by a call record number 119, that were extracted from database 34 (FIG. 1). An outcome of task 104 is the extraction from database 34 of a first one of call records 32 for a most recent call 120, and identified by call record number 119 of "1".

With continued reference to FIGS. 7–8, in response to task 104, a task 122 is performed. At task 122, location information for most recent call 120 is defined as coverage area 26 (FIG. 1) of the particular one of cell sites 22 (transceiver sites) through which most recent call 120 was routed. In addition, a task 124 associates call record 32 for most recent call 120 with coverage area 26 in call history log 106.

As shown in location information field 110, a cell site identifier 126 indicates that most recent call 120 was routed through "cell site A" and the directional antenna for "sector 2". Thus, coverage area 26 for "cell site A, sector 2" is defined as the location information and associated with call record 32 for most recent call 120 in location information field 110 of call history log 106.

Call origination time field 112 indicates an instant 128 of call origination of most recent call 120 as being "10:15:35 AM". The service provider has knowledge of the approximate coverage area 26 of any given one of cell sites 22 at any given instant. This coverage area 26, also known as the coverage footprint for cell site 22 or a sector of cell site 22, may shrink or grow with the traffic capacity carried by cell site 22. Accordingly, by using cell site identifier 124 and the time, i.e., instant 128, of call origination of most recent call 120, the service provider can determine more precisely coverage area 26 in which most recent call 120 took place. Coverage area 26 specific to cell site identifier 124 and the time, i.e., instant 128, may be specified by a string of latitude and longitude coordinates that define coverage area 26, and/or by location identifiers (not shown) that relate to the smallest area of interest in the actual environment. For example, each of the location identifiers may represent a location in the actual environment having an area of approximately one hundred meters by one hundred meters.

Following task 124, a task 130 is performed. Task 130 incorporates call specific characteristics from call record 32 for most recent call 120 in call history log 106. The incorporation of call specific characteristics relates to the information retained in database 34 (FIG. 1) for call records 32. In an exemplary scenario, call specific characteristics incorporated into call history log 106 include a call duration 132 in call length field 114, a call direction 134 and a call destination dialing number 136 in call destination number field 116, and cell site coordinates 138 in cell site location field 118 (shown here as major crossroads).

Following tasks 122, 124, and 130, a task 140 is performed, the quantity of call records 32 (FIG. 1) extracted from database 34 (FIG. 1), $N_{EXTRACTED}$, is incremented by one.

Subprocess 94 proceeds to a query task 142 where the quantity of call records 32 (FIG. 1) extracted from database 34 (FIG. 1), $N_{EXTRACTED}$, is compared to previous calls entry 74, $N_{PAST\ CALLS}$. When query task 142, determines that $N_{EXTRACTED}$ is equivalent to $N_{PAST\ CALLS}$, the compilation of call history log 106 is complete and subprocess 94 exits. However, when query task 142, determines that $N_{EXTRACTED}$ is not equivalent to $N_{PAST\ CALLS}$, i.e., $N_{EXTRACTED}$ is less than $N_{PAST\ CALLS}$, subprocess 94 proceeds to a query task 144.

Query task 144 determines whether there is another one of call records 32 (FIG. 1) in database 34 (FIG. 1) for wireless communication device 24 (FIG. 1). When there is another one of call records 32, program control loops back to task 104 to extract another one of call records 32 from database 34 to compile call history log 106 for wireless communication device 24. Alternatively, when there are no further call records 32 in database 34, the compilation of call history log 106 is complete and subprocess 94 exits.

The result of the activities of subprocess 94 is the compilation of call history log 106 of call records for a calls in which wireless communication device 24 participated. The calls are arranged in call history log 106 in an order from most recent call 120 to progressively earlier calls. For example, call history log 106 includes, a second call 146, identified in call record number field 108 by "2", originated at a second instant 148 of "9:55:17 AM" and a third call 150, identified in call record number field 108 by "3", originated at a third instant 152 of "9:18:56 AM."

With reference back to FIG. 2, when subprocess 94 exits, program control returns to a task 154 of location information provision process 36. The implementation of task 154 results in the provision of location information on a map web page.

Figure 9:
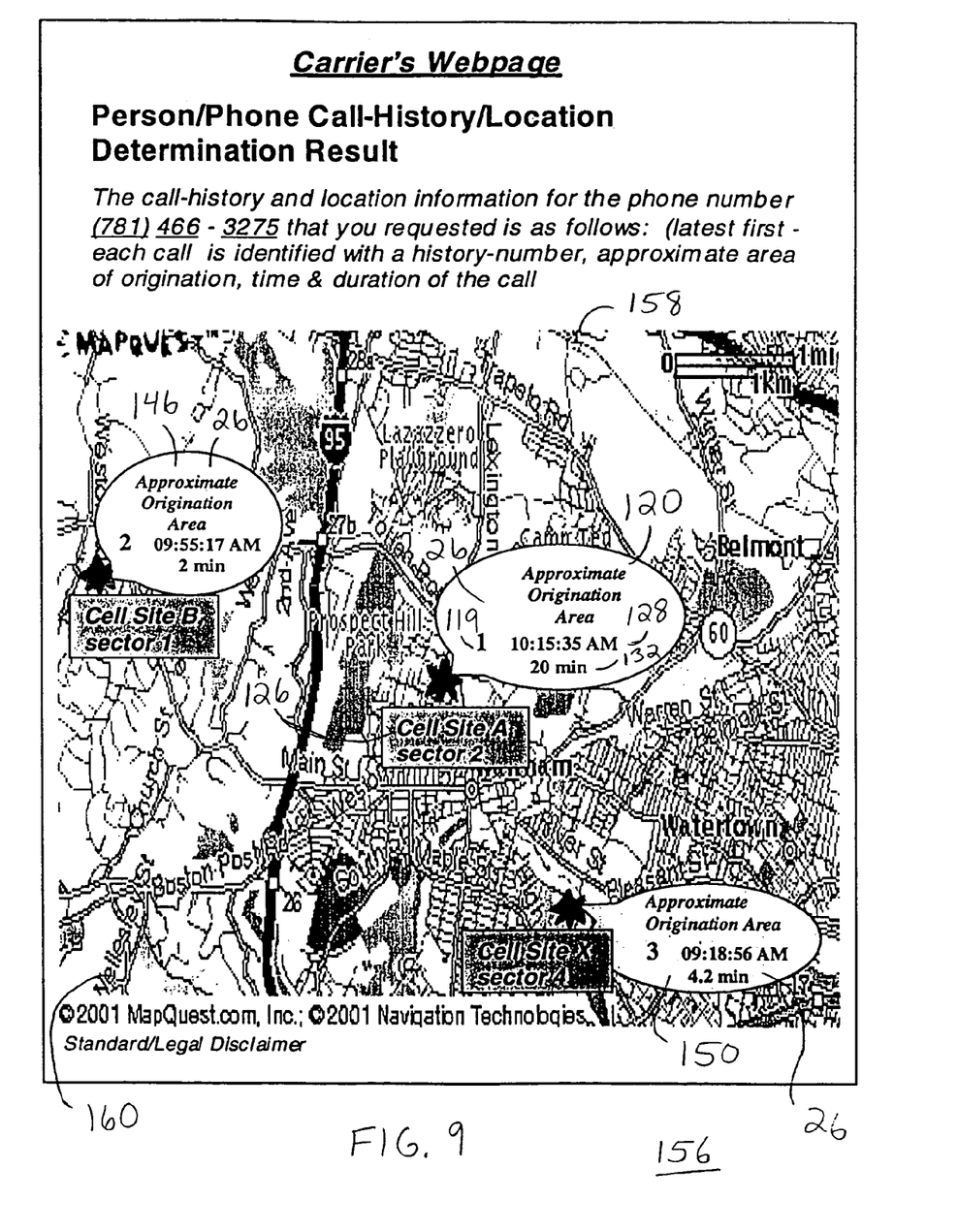
FIG. 9 shows a diagram of a map web page provided by the service provider of a geographical area having an overlay of location information for a wireless communication device in response to the call history log of FIG. 8.

Referring to FIG. 9 in connection with task 154, FIG. 9 shows a diagram of a third web page, or a map web page 156, supplied by the service provider of a map 158 of a geographical area 160 having an overlay of location information for wireless communication device (FIG. 1) in response to call history log 106 (FIG. 8). As discussed above, the location information is defined as coverage area 26 for a particular sector of a particular one of cell sites 22 through which a particular mobile call, i.e., most recent call 120 (FIG. 8), second call 146 (FIG. 8), or third call 150 (FIG. 8), was routed.

At task 154, each coverage area 26 associated with each of most recent call 120, second call 146, and third call 150 is overlaid on geographical area 160 of map 158. In an exemplary implementation, map 154 is presented using a mapping program, such as MapQuest, supplied by MapQuest.com, Inc., Navigation Technologies. MapQuest provides a range of mapping and routing solutions which allows users to map-enable their Web sites, such as map web page 156. In addition, MapQuest provides map manipulation capabilities such as pan, zoom in/out, and so forth.

As shown in map web page 156, location information, i.e., coverage area 26, for most recent call 120, location information, i.e., coverage area 26, for second call 146, and location information, i.e., coverage area 26, for third call 150, is overlaid over geographical area 160. Given this information, a requester can determine an approximate location of wireless communication device 24 (FIG. 1), hence its user at a given time.

Coverage areas 26 are shown as white bubbles that conceal portions of map 158. Those skilled in the art will recognize that coverage areas may be shaded so that underlying portions of map 158 are visible. Map 158 may also include information compiled in call history log 106 (FIG. 8) such as call record number 119, cell site identifier 126, instant 128 of call origination, call duration 132, and so forth.

Following task 154, location information process 36 exits having provided a requester map 158 that is readily interpreted to determine an approximate location of wireless communication device 24 (FIG. 1).

Figure 10:
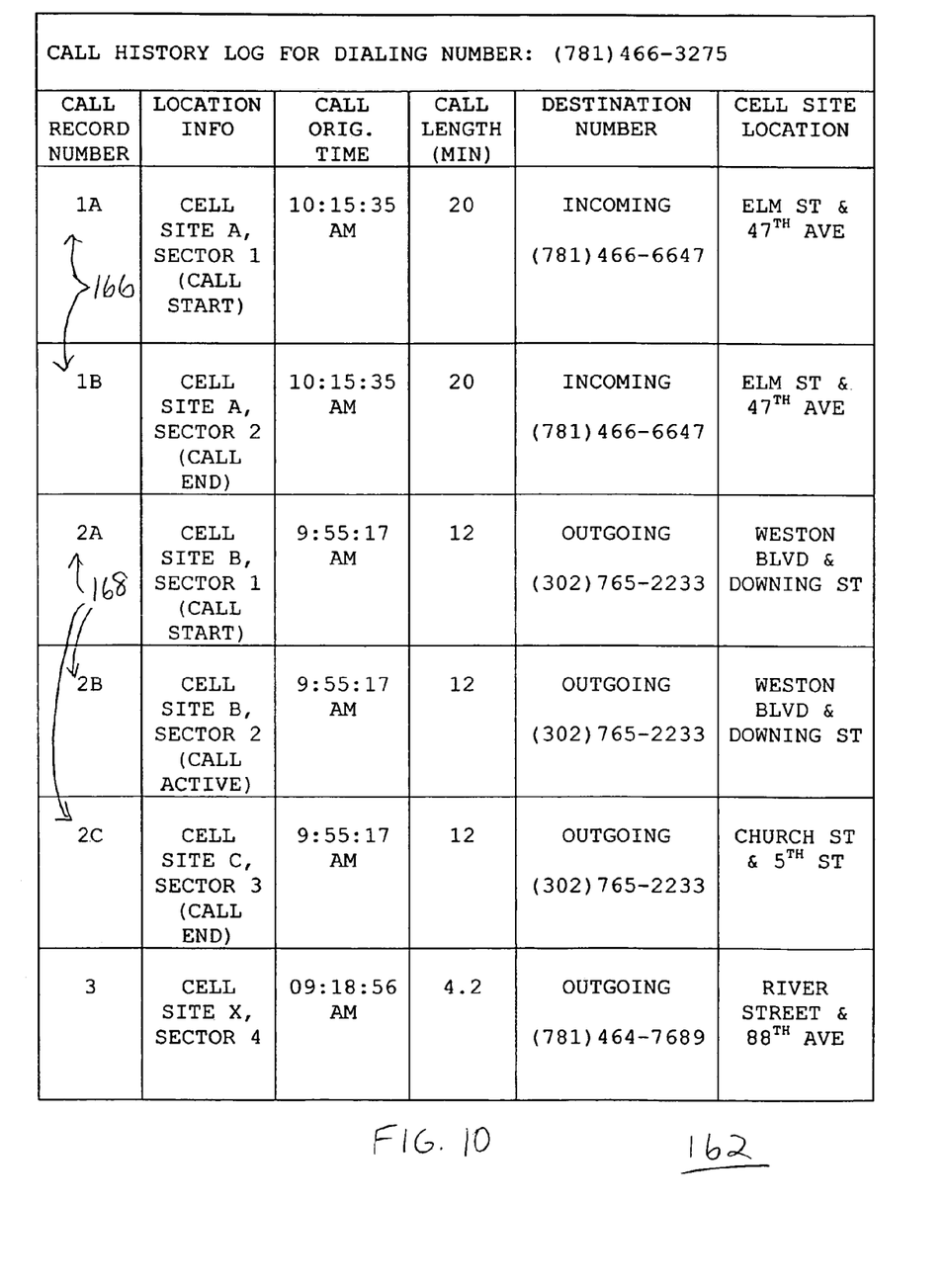
FIG. 10 shows a table of another exemplary call history log for a wireless communication device.
Figure 11:
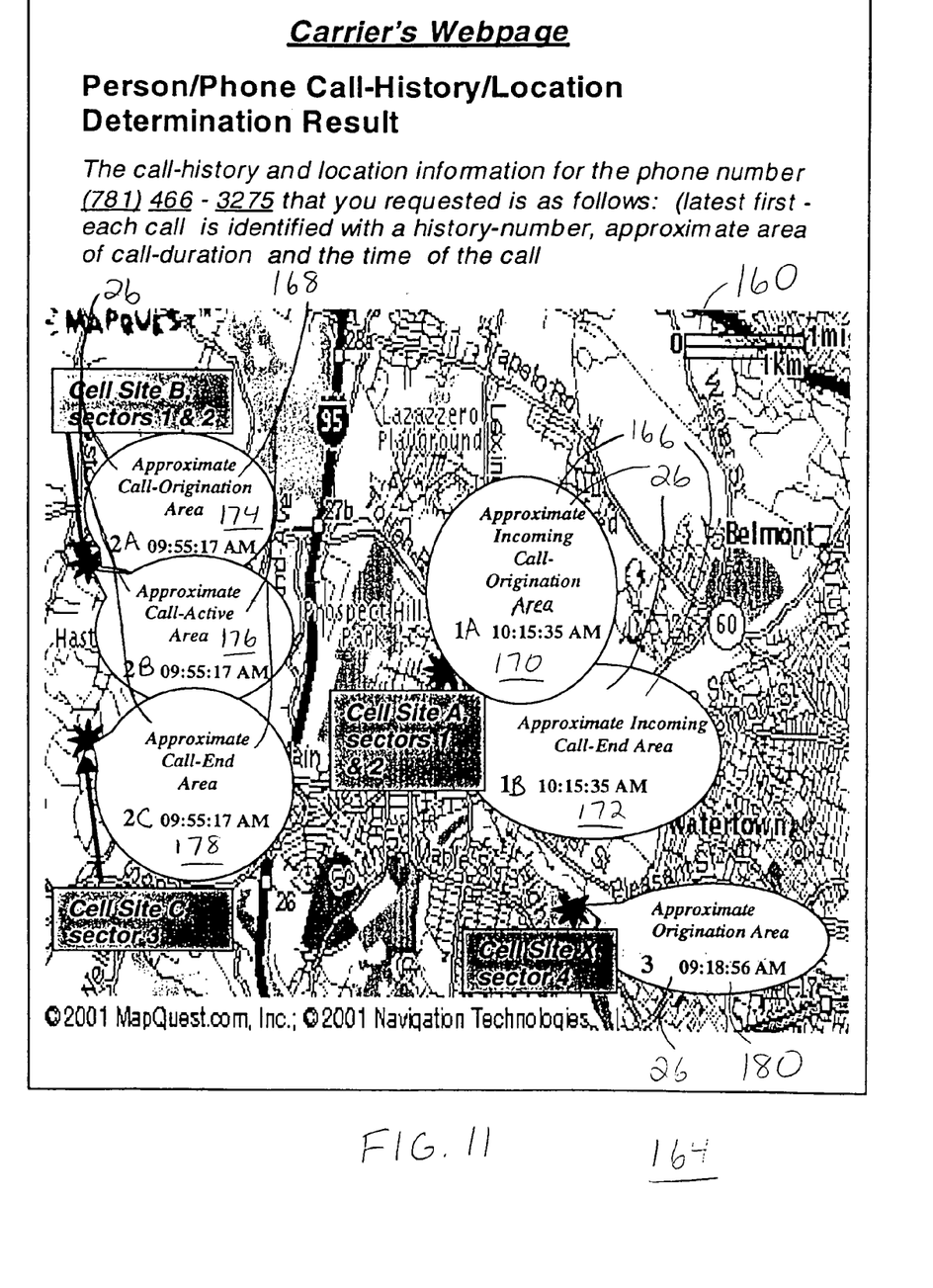
FIG. 11 shows a diagram of a map web page provided in response to the call history log of FIG. 10.

Referring to FIGS. 10 and 11, FIG. 10 shows a table of another exemplary call history log 162 for a wireless communication device 24 compiled during the execution of location information provision process 36 (FIG. 2). FIG. 11 shows a diagram of a map web page 164 provided in response to call history log 162. For a high-mobility user who traverses large geographic areas through several cell site coverage areas 26, it may be desirable to show all of the coverage areas 26 traversed during the duration of each past call.

Call history log 162 illustrates a first call 166, which was received in cell site A, sector 1, and ended in cell site A, sector 2. Similarly, call history log 162 illustrates a second call 168 which was received in cell site B, sector 1, continued in cell site B, sector 2, and ended in cell site C, sector 3. Thus, first and second calls 166 and 168 represent a handoff situation in which the base station controller (not shown) embedded in one of cell sites 22 hands over a cellular call from one radio frequency or channel in the one cell site 22 to another radio frequency or channel in another one of cell sites 22.

As shown in map web page 164, the location information for first call 166 is defined as two of coverage areas 26, i.e., a first coverage area 170 and a second coverage area 172. The location information for second call 168 is defined as three of coverage areas 26, i.e., a first coverage area 174, a second coverage area 176, and a third coverage area 178. The location information for a third call 180 is defined as a single one of coverage areas 26. Given this information, a requester can determine an approximate location of wireless communication device 24 (FIG. 1), hence its user at a given time, and generally track the movement of wireless device 24 through geographical area 160.

In summary, the present invention teaches of a method for supplying location information of a wireless communication device within a wireless communication network. Location information is supplied by utilizing existing technology so that the location information provision processes may be immediately provided as an enhanced network feature to the parents and guardians of their dependents. In addition, by employing this existing technology and billing the users of the location information provision service, the service provider gains a valuable revenue source at little to no cost. The location information is provided via web pages accessible over the Internet by utilizing map-enabled web pages that are readily interpreted by a concerned individual. In addition, log-in safeguards are in place so only authorized parties can receive the location information.

Although the preferred embodiments of the invention have been illustrated and described in detail, it will be readily apparent to those skilled in the art that various modifications may be made therein without departing from the spirit of the invention or from the scope of the appended claims. For example, those skilled in the art will appreciate that the present invention will accommodate a wide variation in the specific tasks and the specific task ordering used to accomplish the processes described herein. In addition, location information can be displayed in wide variety of mapping formats. Alternatively, the location information can be communicated to the requesting party via e-mail, telephone, or fax.

What is claimed is:

1. A method for providing location information of a wireless communication device within a wireless communication network, said method comprising:

receiving a request for said location information from a requesting party;

verifying that said requesting party is an authorized party;

when said requesting party is said authorized party, determining said location information in response to wireless communication between said wireless communication device and a transceiver site of said wireless communication network, said wireless communication being a call in which said wireless communication device participated, said call being routed through said transceiver site, and said determining operation including compiling a call history log for said wireless communication device from a comprehensive call history database maintained by a service provider of said wireless communication network, said call history log including said location information, a call record of said call is registered in said comprehensive call history database, and said compiling operation includes:

accessing said comprehensive call history database to extract said call record;

defining said location information as a coverage area of said transceiver site at a first instant of said call; and associating said call record with said coverage area in said call history log; and supplying said location information to said requesting party.

2. A method as claimed in claim 1 further comprising establishing, prior to said receiving operation, a user profile for said wireless communication device, said user profile containing an identifier for said authorized party.

3. A method as claimed in claim 2 wherein said verifying operation comprises matching a requesting party identifier of said requesting party with said identifier of said authorized party.

4. A method as claimed in claim 1 further comprising detecting, prior to said receiving operation, a log-in attempt at a web page of a service provider of said wireless communication network, said request being received via said web page following successful completion of said log-in attempt.

5. A method as claimed in claim 1 wherein said request includes a dialing number of said wireless communication device.

6. A method as claimed in claim 1 wherein said call record includes an origination time of said call, and said associating operation comprises incorporating said origination time in said call history log.

7. A method as claimed in claim 1 wherein said call record includes a duration of said call, and said associating operation comprises incorporating said duration in said call history log.

8. A method as claimed in claim 1 wherein said call record includes a destination number for said call, and said associating operation comprises incorporating said destination number in said call history log.

9. A method as claimed in claim 1 wherein said call record includes a location coordinate for said transceiver site through which said call was routed, and said associating operation comprises incorporating said location coordinate in said call history log.

10. A method as claimed in claim 1 wherein said call is routed through a second transceiver site of said wireless communication network, a second call record of said call is registered in said comprehensive call history database, and said compiling operation further comprises:
   accessing said comprehensive call history database to extract said second call record;
   defining said location information as a second coverage area of said transceiver site at a second instant of said call; and
   associating said second call record with said second coverage area in said call history log.

11. A method as claimed in claim 1 wherein said call is a first call, said wireless communication device participated in a second call, said second call being routed through a second transceiver site of said wireless communication network, a second call record of said second call is registered in said comprehensive call history database, and said compiling operation further comprises:
   accessing said comprehensive call history database to extract said second call record;
   defining said location information as a second coverage area of said second transceiver site at a second instant of said second call; and
   associating said second call record with said second coverage area in said call history log.

12. A method as claimed in claim 1 wherein said receiving operation comprises detecting a previous calls entry, said previous calls entry instructing an extraction of a quantity of call records of most recent calls in which said wireless communication device participated that are registered in said comprehensive call history database.

13. A method as claimed in claim 1 wherein said supplying operation comprises displaying said location information on a map of a geographical area in which said location information is positioned.

14. A method as claimed in claim 13 wherein said location information is a coverage area of said transceiver site, and said displaying operation comprises overlaying said coverage area on said map of said geographical area.

15. A method as claimed in claim 1 wherein said supplying operation comprises providing said location information via a web page.

16. A method for supplying location information of a wireless communication device within a wireless communication network, said method comprising:
   providing a first web page having a requester log-in section;
   following detection of a successful log-in attempt at said requester log-in section, providing a second web page having a device identifier field; and
   following detection of a device identifier of said wireless communication device in said device identifier field, providing a third web page having a map of a geographical area overlaid with coverage areas of transceiver sites through which calls were routed, said wireless communication device having participated in said calls, and associated ones of said coverage areas defining said location information at instants of said calls.

17. A method as claimed in claim 16 further comprising presenting in said second web page a previous calls field, wherein detection of a previous calls entry in said previous calls field indicates a quantity of most recent ones of said calls for which said associated ones of said coverage areas are to be provided in said map.

18. A method for providing location information of a wireless communication device within a wireless communication network, said method comprising:
   receiving, at a web page of a service provider of said wireless communication network, a request for said location information from a requesting party;
   verifying that said requesting party is an authorized party;
   when said requesting party is said authorized party, compiling a call history log for said wireless communication device from a comprehensive call history database maintained by said service provider, said call history log including said location information responsive to wireless communication between said wireless communication device and transceiver sites of said wireless communication network, said wireless communication is a quantity of calls in which said wireless communication device participated, said calls being routed through said transceiver sites, a call record for each of said calls is registered in said comprehensive call history database, and said compiling operation comprises, and said compiling operation includes:
   accessing said comprehensive call history database to extract a quantity of most recent ones of said call records;
   defining said location information as coverage areas of said transceiver sites at instants of said calls; and
   associating said call records with said coverage areas in said call history log; and
   supplying said location information to said requesting party by displaying said location information on a map of a geographical area in which said location information is positioned.

19. A method as claimed in claim 18 wherein said supplying operation comprises overlaying said coverage areas on said map of said geographical area.

20. A computer-readable storage medium containing executable code for instructing a server system to provide location information of a wireless communication device within a wireless communication network over the Internet, said executable code instructing said server system to perform operations comprising:

provided a first web page having a requester log-in section;

providing a second web page having a device identifier field following detection of a successful log-in attempt by a requesting party at said requester log-in section;

providing a third web page having a map of a geographical area overlaid with coverage areas of transceiver sites through which calls were routed following detection of a device identifier of said wireless communication device in said device identifier field, said wireless communication device having participated in said calls, and associated ones of said coverage areas defining said location information at instants of said calls.

21. A computer-readable storage medium as claimed in claim 20 wherein said executable code further instructs said server system to perform an operation comprising presenting in said second web page a previous calls field, wherein detection of a previous calls entry in said previous calls field indicates a quantity of most recent ones of said calls for which said associated ones of said coverage areas are to be provided in said map.

22. A computer-readable storage medium as claimed in claim 20 wherein said executable code further instructs said server system to perform operations comprising:

determining whether said requesting party is an authorized party by accessing a user profile for said wireless communication device, said user profile containing an identifier for said authorized party; and providing an access denial web page when a requesting party identifier of said requesting party fails to match said identifier of said authorized party.

* * * * *